United States Patent Office 2,777,844
Patented Jan. 15, 1957

2,777,844
SULFONAMIDE PURIFICATION PROCESS

John C. Paterson, New City, N. Y., and John E. Gordon, Middlesex Borough, N. J., assignors to American Cyanamid Company, New York, N. Y., a corporation of Maine No Drawing. Application February 28, 1956,
Serial No. 568,194

9 Claims. (Cl. 260—239.95)

This invention relates to a process for the purification of aryl sulfonamides, and, more particularly, it relates to an improved process for the preparation of free-flowing sulfathiazole stable to sterilization.

Amide derivatives of sulfanilic acid, otherwise known as sulfanilamides or sulfa drugs, occupy an important position in the therapy of infectious diseases. Various of the sulfanilamides are particularly useful in certain therapeutic applications. Sulfathiazole is an important member of this class of compounds. It has been used for a number of years and has many important applications. It is often administered directly in open wounds, in preparation for which sulfathiazole of high chemical quality is required. Methods of purification are known in the art which produce sulfathiazole suitable for preparing tablets. However, for certain uses in addition to being of high chemical quality, it is necessary that the drug particle size be in such a range that the product is free-flowing. In addition, the drug must be capable of undergoing sterilization at high temperatures. It is necessary that the powder be sterile in order to prevent the introduction of additional pathogenic organisms into the wound. These requirements are especially true when the drug is to be used in the solid state for drug application to open wounds due to surgery, trauma, etc. In such an application the drug is packaged in small sterile parcels from which the drug in powder form must flow freely and completely.

In the past, high chemical purity sulfathiazole has resulted from ordinary methods of purification such as recrystallization from ethanol or acid precipitation from an alkaline solution. These methods do not give a satisfactory recovery of a product consisting of particles which are free-flowing and, at the same time, sterilizable. Granular types of materials which are easily obtained by known methods of purification are usually stable to sterilization but this material is not free-flowing. In contrast, the free-flowing fractions of crystals obtained by known methods are not stable with sterilization procedures since the latter customarily involves heating at high temperatures.

Sulfathiazole with the required free-flowing properties has certain characteristics of particle size and, in addition, has crystals whose nature is such that they do not easily fracture. Material which flows freely at the desired rate can be described as 30–80 mesh material by which is meant that the crystals must pass through a 30 mesh screen and be held by an 80 mesh screen. The mesh of a screen is the number of openings per square inch.

The fracture characteristics of the crystals are also important. If they are of a plate-like quality they tend to fracture easily and thus the particle size characteristics change so that they are no longer free-flowing. Easily fracturable crystals do not retain their free-flowing properties in transit when shipped, and prolonged screening of such crystals tends to decrease the amount of usable material. To obtain a satisfactory free-flowing powder, crystals of the proper type and size msut be obtained.

In addition, the product, to be satisfactory, must withstand sterilization by heating for a number of hours at 125°–135° C. or higher. When heated to this sterilization temperature for the required time the usual samples of sulfathiazole hitherto obtainable undergo partial decomposition. The product acquires a dark color and becomes otherwise unsuitable for use as free-flowing crystalline material in open wounds.

Various techniques have been attempted in the past to obtain material which is both free-flowing and stable to sterilization. Although it has been possible to obtain such materials with rather tedious procedures the yield or percent of recovery of usable material has been so low as to make the cost of the material prohibitive or the process uneconomical. Much time and effort have been put into such attempts but low and unsatisfactory recoveries of usable material have resulted.

We have now found that by employing a saturated aliphatic alcohol of 3 carbon atoms in the recrystallization process for sulfathiazole, surprisingly high recoveries of free-flowing, sterilization stable material are obtained. This is most unexpected since recrystallization from various other alcohols gives low recoveries of usable product and it could not be predicted that saturated aliphatic alcohols of 3 carbon atoms such as propanol and isopropanol would show this decided improvement over such related compounds as methanol. The increase in recovery is such that it results in an economic and practical process for obtaining free-flowing sulfathiazole stable to sterilization. The use of other solvents, especially the alcohols, results in high losses of material.

Sulfathiazole of various degrees of purity may be used in the purification process of our invention. Regardless of the purity of the starting material high yields of a free-flowing, sterilization stable product result, but the degree of chemical purity of the product will vary to some extent with the purity of the starting material.

In our new purification procedure one part of the sulfathiazole to be improved is recrystallized by heating above 60° C. in from about 4 to 10 parts by weight of the saturated 3-carbon atom alcohol. The solution is then cooled below about 30° C. The purified sulfathiazole is isolated and that portion of the desired particle size is removed. The material so obtained shows the desired free-flowing characteristics and is stable to sterilization.

The alcohols used may contain from 15 to about 40% water. However, we prefer to use isopropanol containing about 30% water. Fresh solvent does not have to be used for each purification. The mother liquor from a purification may be recycled a number of times.

When temperatures below the boiling point are used, the solvent must be used in greater proportion or in more anhydrous conditions or both. A practical lower limit of temperature to achieve complete solution is about 65° C. To achieve the greatest recovery it is preferable that the solution be cooled below 10° C., but satisfactory recoveries are obtainable below 30° C. A hot clarification of the solution before cooling using a decolorizing medium such as charcoal and a filter aid, is preferable with many commercial grades of sulfathiazole.

This application is a continuation-in-part of our co-pending application, Serial No. 462,375, filed October 14, 1954, now abandoned.

The process of our invention may be illustrated by the following examples in which parts are by weight unless otherwise specified.

Example 1

157 parts of sulfathiazole are added to 1000 parts by volume of 70% isopropanol and the mixture is heated at the boiling point until solution is complete. After adding 4 parts of activated charcoal and 2 parts of a filtering aid the solution is clarified by filtration. The filtered solution is then allowed to cool to 0° C. without stirring. The precipitated solid is removed by filtration, washed with 100 parts of water and dried.

The dried product amounts to 137 parts. Upon screening, 100 parts pass through a 30 mesh screen and remain on an 80-mesh screen. The nature of the crystals is such that upon prolonged screening no appreciable amount passes through the 80-mesh screen. Upon sterilization by heating at 135° C. for six hours, there results no decomposition or coloring of the material.

*Example 2*

To 1000 parts by volume of 70% N-propanol is added 152 parts of sulfathiazole. The mixture is heated at almost the boiling point until complete solution results. Four parts of decolorizing charcoal and 2 parts of diatomaceous earth are then added and the hot mixture is then filtered. The clear solution is then allowed to cool to about 0° C. without stirring and the precipitated product is removed by filtration. The 146 parts of solid material which are obtained give on screening about 69 parts of 40–80 mesh material. This undergoes sterilization by heating at 135° C. for six hours with no decomposition or discoloration.

*Example 3*

Sulfathiazole is added to 1000 parts by volume of solvent at the boiling temperature until no more dissolves. The amount necessary to form the saturated solution is recorded. Four parts of activated charcoal and two parts of a filter-aid are added and the hot solution is clarified. The filtrate is allowed to cool to 0° C. without stirring, and the crystals are isolated by filtration, washed, and dried. The weight of the product is noted, after which it is screened through 40 and 80 mesh screens. A sample of the 40–80 mesh product is sterilized by heating at 135° C. for six hours, noting whether any discoloration occurs. The results obtained with various solvents are as follows.

| Solvent Percent Composition by Volume, Mixed with Water | Product | | | | Parts by Volume of Solvent per part 40–80 product | Sterilization Result |
|---|---|---|---|---|---|---|
| | Parts of Sulfathiazole | Isolated (parts) | Percent 40–80 mesh | Parts of 40–80 mesh | | |
| 60% isopropanol | 140 | 131.4 | 57.4 | 75.0 | 13.3 | very slight discoloration. |
| 70% isopropanol | 157 | 137.4 | 55.5 | 76.4 | 13.1 | no discoloration. |
| 80% isopropanol | 107.3 | 97.8 | 57.6 | 56.4 | 17.7 | Do. |
| 70% ethanol | 92 | 89.1 | 46.0 | 41.0 | 24.4 | slight discoloration. |

We claim:

1. The process for producing a free-flowing sulfathiazole powder stable to sterilization which comprises heating sulfathiazole in from about 4 to 10 parts by weight, based on said sulfathiazole, of a propanol containing at least 15% but not more than 40% water to a temperature greater than 65° C. but not higher than the boiling point of said propanol until a solution is obtained, cooling the said solution below about 30° C., isolating the insoluble matter, and removing therefrom the product of a particle size such that it passes through a 30 mesh screen and is stopped by an 80 mesh screen.

2. The process according to claim 1 in which charcoal and a filter aid are added to the hot alcoholic solution of sulfathiazole and the mixture is filtered hot before said cooling of the sulfathiazole solution.

3. The process according to claim 2 in which the temperature to which the alcoholic solution of sulfathiazole is heated is approximately the boiling point of said alcohol.

4. The process according to claim 3 in which the solution of sulfathiazole is cooled below 10° C. in order to isolate the desired product.

5. The process according to claim 1 in which the alcohol is isopropanol.

6. The process according to claim 1 in which the alcohol is propanol.

7. The process according to claim 4 in which the alcohol is isopropanol.

8. The process according to claim 4 in which the alcohol is propanol.

9. The process according to claim 7 in which the amount of water in the isopropanol is about 30%.

References Cited in the file of this patent

UNITED STATES PATENTS 2,333,445    Roblin et al. _____ Nov. 2, 1943